United States Patent
Mukherjee et al.

(10) Patent No.: US 10,362,029 B2
(45) Date of Patent: Jul. 23, 2019

(54) MEDIA ACCESS POLICY AND CONTROL MANAGEMENT

(71) Applicant: INTERNATIONAL BUSINESS MACHINES CORPORATION, Armonk, NY (US)

(72) Inventors: Maharaj Mukherjee, Poughkeepsie, NY (US); Monimala Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 15/413,603

(22) Filed: Jan. 24, 2017

(65) Prior Publication Data

US 2018/0212959 A1    Jul. 26, 2018

(51) Int. Cl.
H04N 21/4415 (2011.01)
H04L 29/06 (2006.01)
G06N 20/00 (2019.01)
H04N 21/442 (2011.01)
H04N 21/45 (2011.01)

(52) U.S. Cl.
CPC ......... *H04L 63/0861* (2013.01); *G06N 20/00* (2019.01); *H04L 63/105* (2013.01); *H04L 63/205* (2013.01); *H04N 21/4415* (2013.01); *H04N 21/44218* (2013.01); *H04N 21/4532* (2013.01)

(58) Field of Classification Search
CPC ........................ H04N 21/4532; H04N 21/4751
See application file for complete search history.

(56) References Cited

U.S. PATENT DOCUMENTS

| | | | | |
|---|---|---|---|---|
| 7,412,538 | B1 * | 8/2008 | Eytchison | H04L 12/2809 370/352 |
| 8,515,334 | B1 * | 8/2013 | Wendkos | G09B 7/00 434/307 R |
| 8,640,190 | B1 * | 1/2014 | Banerjee | G06F 21/604 707/722 |
| 9,571,890 | B1 * | 2/2017 | Diamondstein | H04N 21/4532 |
| 2005/0191605 | A1 * | 9/2005 | Nguyen | G09B 7/02 434/188 |
| 2007/0150916 | A1 * | 6/2007 | Begole | H04H 60/31 725/10 |

(Continued)

OTHER PUBLICATIONS

"Digital Detox Tips for the Whole Family", Aug 25, 2016, obtained online from <http://www.strong4life.com/en/pages/activity/articles/digital-detox-tips-for-the-whole-family>, retrieved on Sep. 11, 2018.*

*Primary Examiner* — Farid Homayounmehr
*Assistant Examiner* — Zhimei Zhu
(74) *Attorney, Agent, or Firm* — Griffiths & Seaton PLLC

(57) ABSTRACT

Embodiments for media access policy and control management by one or more processors. A user is identified using biometric data to enable enforcement of one or more media policies for controlling access to media content for one or more types of computing devices. The one or more media policies may be incrementally applied over a predetermined period of time according to a resistance factor of the user to the one or more media policies for controlling access to media content for each of the one or more types of computing devices.

20 Claims, 8 Drawing Sheets

(56) References Cited

U.S. PATENT DOCUMENTS

| | | | |
|---|---|---|---|
| 2007/0202481 A1* | 8/2007 | Smith Lewis | G09B 19/06 434/323 |
| 2008/0038708 A1* | 2/2008 | Slivka | G09B 7/08 434/350 |
| 2011/0065082 A1* | 3/2011 | Gal | G09B 7/02 434/365 |
| 2011/0117534 A1* | 5/2011 | Berger | G09B 7/02 434/350 |
| 2013/0225151 A1 | 8/2013 | King et al. | |
| 2013/0262365 A1* | 10/2013 | Dolbear | G06N 5/02 706/47 |
| 2013/0290994 A1* | 10/2013 | Machado | H04N 21/23418 725/12 |
| 2014/0007154 A1 | 1/2014 | Seibold et al. | |
| 2014/0279143 A1* | 9/2014 | Hyde | G06Q 30/08 705/26.3 |
| 2014/0279145 A1* | 9/2014 | Hyde | G06Q 30/08 705/26.3 |
| 2014/0281993 A1* | 9/2014 | Hyde | H04N 21/2541 715/719 |
| 2015/0149278 A1* | 5/2015 | Yu | G06Q 30/0247 705/14.46 |
| 2015/0237412 A1* | 8/2015 | Shimy | H04N 21/812 725/12 |
| 2016/0134638 A1* | 5/2016 | Tulshibagwale | H04L 63/105 726/4 |
| 2016/0182934 A1* | 6/2016 | Nichols | H04N 21/25841 725/25 |
| 2016/0266740 A1* | 9/2016 | Glasgow | G06Q 10/101 |
| 2016/0267509 A1* | 9/2016 | Grosso | G06Q 30/0206 |
| 2016/0307030 A1 | 10/2016 | Samet | |
| 2016/0371099 A1* | 12/2016 | Woog | G06F 9/44505 |
| 2017/0178178 A1* | 6/2017 | Zhang | G06F 17/30867 |
| 2017/0178532 A1* | 6/2017 | Lu | G09B 5/00 |
| 2017/0302979 A1* | 10/2017 | Kaya | H04N 21/252 |
| 2017/0339338 A1* | 11/2017 | Gordon | G06K 9/00302 |
| 2017/0339467 A1* | 11/2017 | Patel | H04N 21/4826 |

* cited by examiner

US 10,362,029 B2

MEDIA ACCESS POLICY AND CONTROL MANAGEMENT

BACKGROUND OF THE INVENTION

Field of the Invention

The present invention relates in general to computing systems, and more particularly to, various embodiments for media access policy and control management by one or more processors.

Description of the Related Art

In today's society, parents, guardians, organizations, or businesses are confronted with large amounts of media content for entertainment, educational, and/or recreational purposes. The advent of computers and networking technologies have made possible the intercommunication and delivery of media content in a variety of places and settings. For example, a parent, may deem some content inappropriate for a child and may wish to prevent that child from accessing such content. However, it may be difficult to enforce control across multiple devices that can be shared and used almost anywhere.

SUMMARY OF THE INVENTION

Various embodiments for media access policy and control management by one or more processors, are provided. In one embodiment, by way of example only, a method for media access policy and control management, again by one or more processors, is provided. A user is identified using biometric data to enable enforcement of one or more media policies for controlling access to media content for one or more types of computing devices. The one or more media policies may be incrementally applied over a predetermined period of time according to a resistance factor of the user to the one or more media policies for controlling access to media content for each of the one or more types of computing devices.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
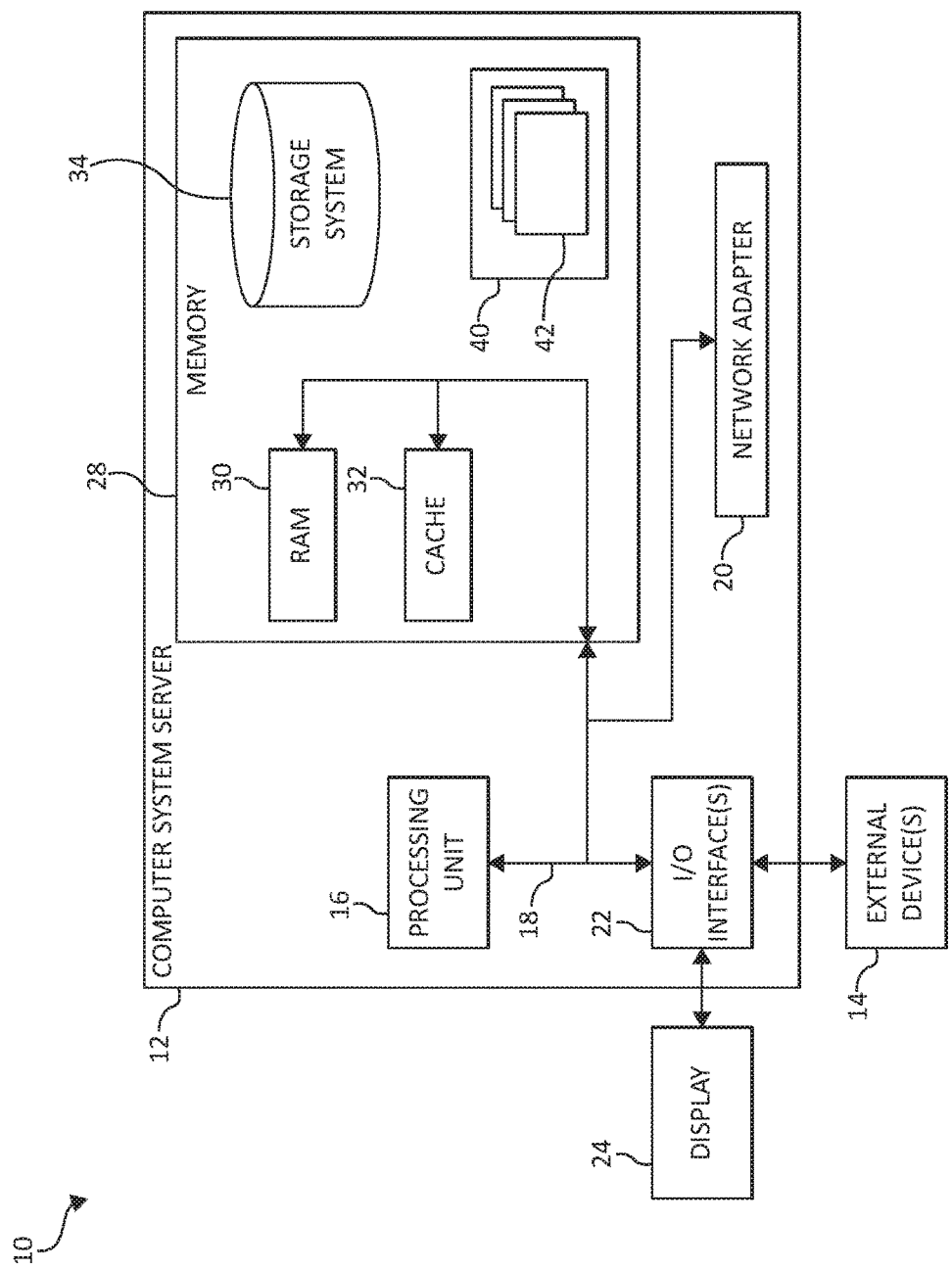
FIG. 1 is a block diagram depicting an exemplary computing node according to an embodiment of the present invention.

As the demand for and level of digital content continues to expand in our society, consumers of media content, particularly minor children typically under the age of 18, continue to be exposed to content by producers that parents, governments, business administrators, or other entities do not want their patrons, colleagues, and/or children to see or view. The openness of the internet with the ever-increasing availability of a variety of types of computing devices for viewing, interacting, or engaging with media content, provides the ability of users to have continuous access to inappropriate content. This continues to be a problem, particularly as parents often cannot police the streaming content into their homes due to the lack of advances in digital control technology. Moreover, parents find it difficult to enforce their control over their minor child of the level of access to media content across multiple devices that can be shared and used anywhere away from the personal supervision of the parent, such as, for example, an unsupervised room, a basement, a neighbor or friend's home, or other area of interest. In addition, parents or guardians find it difficult in establishing and maintaining consistent and progressive control over the level of access to media content without the minor child engaging in a negative response.

Thus, the present invention provides a solution to allow continual and consistent control of media access by an administrator, such as a parent, an administrator of a business, or other entity responsible for media access management so as to enable application of one or more media policies according to an iterative and gradual application. In one aspect, a user such as, a minor child under the age of 18, may be identified using biometric data to enable enforcement of one or more media policies for controlling access to media content for one or more types of computing devices. The one or more media policies may be incrementally and iteratively applied over a predetermined period of time according to a resistance factor of the user to the one or more media policies for controlling access to media content for each of the one or more types of computing devices.

In one aspect, the present invention provides for customized application of one or more media policies and controls according to individualized age, emotional state (e.g., a maturity level), and/or a user based media control. The present invention provides for customized application of one or more media policies and controls for a user for a plurality of computing devices and/or shared computing devices. Each of the plurality of computing devices and/or shared computing devices may incorporate a facial recognition operation and/or other biometric based identification capability (e.g., fingerprint scan, retinal scan, voice recognition, etc.) of the user and applies one or more media policies and controls set forth, defined, and/or customized by the parent for the child, and/or may use a default age appropriate media policy and control. Furthermore, the one or more media policies and controls may be graduating and/or age based policies so that any change may be adjusted by the parents and/or the child.

In one aspect, the one or more media policies and controls are based on usage-based policy. That is, the one or more media policies and controls may be tailored to how a device is being used (e.g., is the device being used for recreational, educational, or business/work related purposes). For example, academic and enrichment usage may have a different policy than entertainment usage policy. The one or more media policies and controls can be based on 1) a total time of usage across devices or across category or both and/or 2) the appropriateness of the media content.

The one or more media policies and controls can be applied to a specific user for a variety of computing devices. For example, upon a computing device entering an area of interest (e.g., a home or office such as when a friend or babysitter visits the home of the minor child) the one or more media policies and controls can be automatically applied on any device. For example, the device, which may be a Wi-Fi and/or a router using similar technologies (e.g., one or more various wireless communication technologies) except that when any other devices try to use the device to access any outside connection—the device may apply the parental policy on that particular device. Thus, a biometric recognition (e.g., facial recognition) operation enables the device to identify the person who is using the device and allow the device to apply the policies based on that identification.

Upon a computing device entering an area of interest (such as a location away from the home or office) and/or upon connection to one or more selected wireless access points ("WAP") (e.g., a smart phone connecting to Wi-Fi at a coffee shop or academic institution), the one or more media policies and controls applicable to the user may be automatically enforced along with any additional policy associated with an area of interest and/or WAP.

In this way, the present technology provides improvements to media policies and controls since the current state of the art is device specific media policies and controls as compared to user specific media policies and controls. Thus, various embodiments of the present invention provide 1) individual user based media policies and controls for accessing media content, 2) application of the media policies and controls for accessing media content to any type of computing devices, and/or 3) provide a gradual/graduation media policy and control for accessing media content. The present invention may use biometric data to identify a user of one or more types of computing devices to ensure that appropriate age and emotional state (e.g., a defined maturity level) based policies are applied to an individual user and not the device itself. In an additional aspect, the present invention provides media policy and control for accessing media content that may be applied to wherever a computing device associated with a user (e.g., a personal smartphone, laptop, and/or tablet) is transported. The media policy and control for accessing media content may also be applied to any "outside" device that may not be associated with the user/child (e.g., a friend's smartphone, computer, or television). Also, the media policy and control for accessing media content may be enforced in a gradual or incremental fashion based on the age, emotional state (e.g., a defined maturity level) as approved by a parent, legal guardian, and/or business administrator for each one of a plurality of levels of constraints of the media policies and controls for accessing media content over a predetermined period of time.

One or more machine learning models may be invoked and applied to learning over time an emotional state of a user, a response to each applied level of constraints of the media policies and controls for accessing media content over a predetermined period of time. In one aspect, one or more devices (e.g., microphone, voice capturing endpoint, retina scanner, heart monitor, video camera, and the like) may be used to capture speech, emotional data, biometric data, and/or psychophysical characteristics or parameters (e.g., electro dermal activity, heart rate, blood pressure, etc.) data. Combined with the machine learning, other functionality of the present invention may identify the user and adjust a resistance factor, which may be set and defined by a parent, according to a positive or negative response to each stage or level of constraints of the media policies and controls for accessing media content over a predetermined period of time.

It should be noted that reference to calculating, determining, setting, and/or assigning a resistance factor may be set as a numerical value, weighted values, and/or an aggregate number of the weighted values that may be compared against the numerical threshold value. In one aspect, calculations or determination operations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
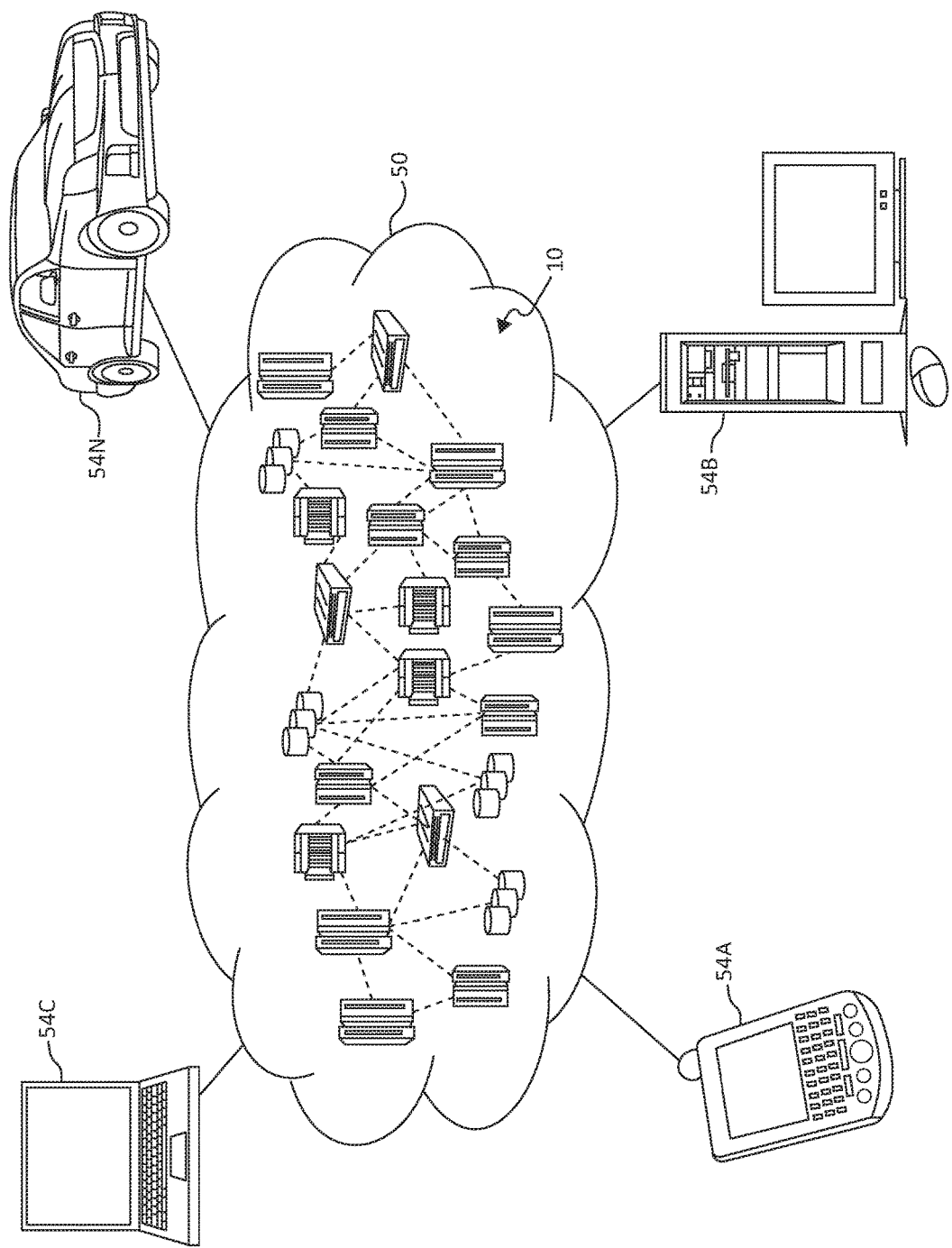
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
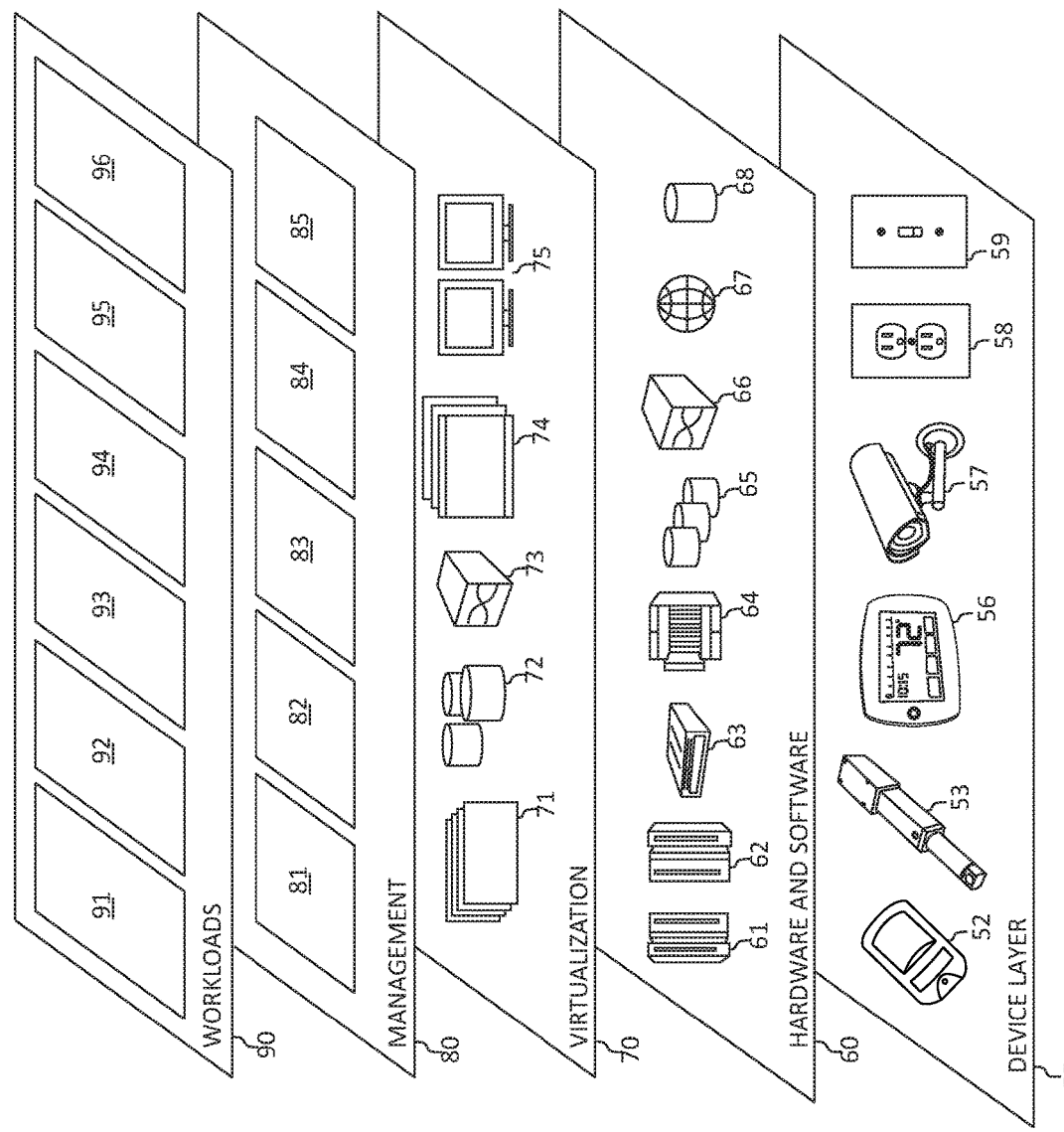
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various media access policy and control management workloads and functions 96. In addition, media access policy and control management workloads and functions 96 may include such operations as data analytics, data analysis, and as will be further described, notification functionality. One of ordinary skill in the art will appreciate that the media access policy and control management workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for media access policy and control management. The media access policy and controls may be applied across one or more devices belonging to a minor individual and/or one or more devices belonging to an alternative individual, entity, or origination (e.g., friend, business, school, computer store, hotel, etc.) so as to enforce one or more parental policies at one or more areas of interest, WAP, and/or during one or more various time periods. In one aspect, the present invention may determine for each individual the type of media content a minor may consume or view, such as, for example, a type of rating assigned to the media content (e.g., rated G—indicating general audiences wherein all ages are permitted, PG—indicating parental guidance is suggested wherein some material may not be suitable for children, PG-13—indicating parents are strongly cautioned wherein some material may be inappropriate for children under the age of 13, R—indicating restricted wherein individuals under the age of 17 require an accompanying parent or adult guardian, and NC-17 or X indicating no one 17 should be allowed to view the media content), as well as total time for usage of each of programs or a total allowable usage time across all the devices.

The present invention may override, replace, and/or add to one or more media access policies and controls. For example, certain educational programs that a child may be required to view for academic reasons or homework, which may be violating a constraint of the media access policy and controls, may be viewed or accessed by the child upon overriding, replacing, and/or redefining the one or more constraints of the media access policy and controls. Each of the various types of computing devices that may be connected to a home network either through cable or interne may enforce the media access policy and controls and/or override the media access policy and controls. The media access policy and controls may be applied and enforced at various time intervals or iteratively in a gradual manner over a selected time period for better adaptation and minimized backlash and protest for the user (e.g., minor child). In this way, a possible negative emotional or behavioral response may be minimized while also adjusting and acclimating the user/child to one or more constraints or boundaries of the media access policy and controls.

A time period for applying the media access policy and controls may be dynamically adjusted based on age, language or speech of a user, behavior of the user, the emotional state (e.g., "mood") of the child, such as a negative or positive emotional response, and/or a plurality of other factors of the child. For example, a selected portion of a time period may be adjusted reducing the total time of usage of recreational usage or entertainment usage of media content while simultaneously incrementally increasing the time for academic usage of media content of the defined time period. In one aspect, objectionable media content, inappropriate media content, and or media content that results in a possible negative impact may be immediately blocked from viewing or consumption.

Figure 4:
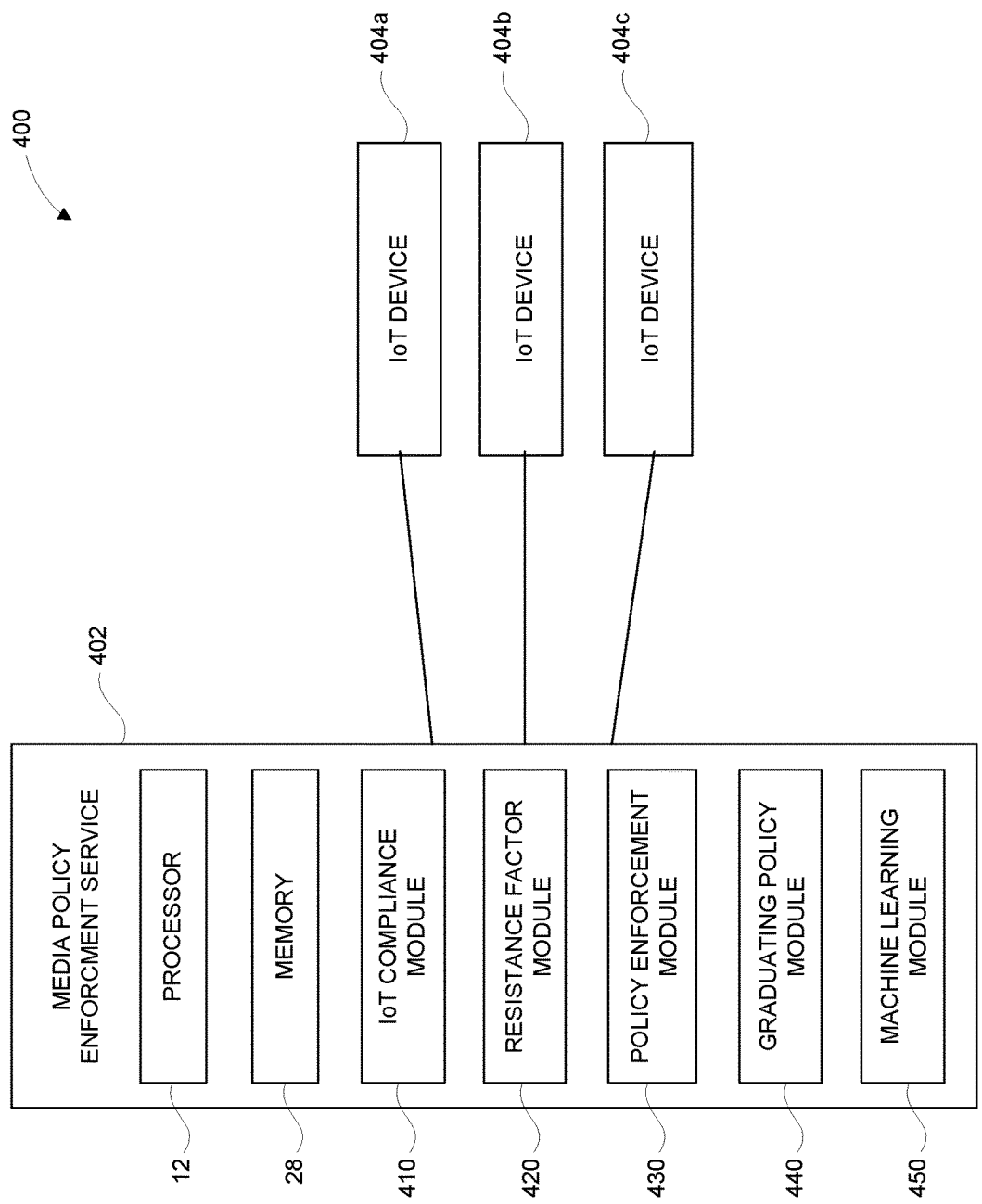
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as a media policy (and control) enforcement service 402, having an IoT device compliance module 410, a resistance factor module 420, a policy enforcement module 430, a graduating policy application module 440, and a machine learning module 450, each of which may work in communication with each other.

The media policy enforcement service 402 may be in communication with one or more IoT devices 404 (illustrated as 404a-c in FIG. 4). The media policy enforcement service 402 may determine performance capabilities, functions, services, and/or other functionality of each IoT device, such as IoT devices 404a-c, combination of IoT devices, and/or a computing network (e.g., an IoT network) as depicted herein. The IoT device compliance module 410 may be used to determine if each of the IoT devices 404a-c are compliant with one or more media policy and control applications for a user (e.g., a minor child under 18 years of age).

The machine learning module 450 may continuously and automatically receive from one or more IoT devices, such as IoT devices 404a-c, feedback according to applied media policy and control applications for each user.

The IoT device compliance module 410, which may work in conjunction with the resistance factor module 420, may determine which of the one or more media policy and control applications are applicable to each of the IoT devices 404a-c or a combination thereof. A set of constraints may be created by the IoT device compliance module 410 and/or the machine learning module 450 from the one or more media policy and control applications for each of the IoT devices 404a-c. The IoT device compliance module 410 may determine whether or not each of the IoT devices 404a-c are compliant or non-complaint according to the created set of constraints of the one or more media policy and control rules/applications.

The resistance factor module 420 may create and assign a resistance factor for each one of a plurality of constraints of the one or more media policy and control rules/applications. The resistance factor may be derived using a cognitive method based on language or speech of a user, behavior of the user, and/or the emotional state (e.g., "mood") of the child, such as a negative or positive emotional response, that child demonstrates to the one or more media policy and control rules/applications. That is, the minor child may display a negative response that may prevent implementation of a constraint of the one or more media policy and control rules/applications. The resistance factor may be adjustable based on any stated or defined flexibility that may be available to the user and provided by a parent or guardian of the user. The resistance factor module 420 may set the resistance factor equal to a value within a range of values, wherein the range of values include at least values representing a degree of familiarity of the user with one of a plurality of constraints of the one or more media policies and defined values representing a positive impact of the user with one of a plurality of constraints, and/or assign the resistance factor to each one of a plurality of constraints of the one or more media policies.

The resistance factor module 420 increases the resistance factor upon detection of a negative response of the user to one of a plurality of constraints of the one or more media policies, and/or decreases the resistance factor upon detection of a positive response of the user to one of a plurality of constraints of the one or more media policies.

The policy enforcement module 430 may provide, suggest, and/or apply one or more of a plurality of constraints of the one or more media policies for each of the IoT devices 404*a-c* in an IoT network that have been identified and associated with the user (e.g., minor child). The policy enforcement module 430 may also implement one or more media policies upon the user using the one or more types of computing devices, such as IoT devices 404*a-c*, within a defined area of interest or upon connection to one or more wireless access points (WAP).

In conjunction and/or association with the policy enforcement module 430, the graduating policy module 440 may incrementally or iteratively apply a selected portion of the one or more media policies upon the resistance factor being less than a resistance threshold over a predetermined time period. In one aspect, the one or more media policies may have an initial phase, one or more intermediary phases, and/or a final or complete phase. Alternatively, the one or more media policies may have a transition phase, a stable-state phase, and/or a graduating phase.

For example, the graduating policy module 440 may indicate to the policy enforcement module 430 to only the initial phase, which may have one or more constraints or level of constraints of the one or more media policies. When the resistance factor is less than a predetermined resistance factor threshold, the policy enforcement module 430 may apply additional constraints or increased levels of constraints of the one or more media policies of the intermediary phases and then to the final or complete phase, where all constraints and/or all levels of the constraints of the one or more media policies may be applied to the user.

The IoT device compliance service 410 and/or machine learning module 450 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environement), the computing devices may be monitored for compliance.

Figure 5:
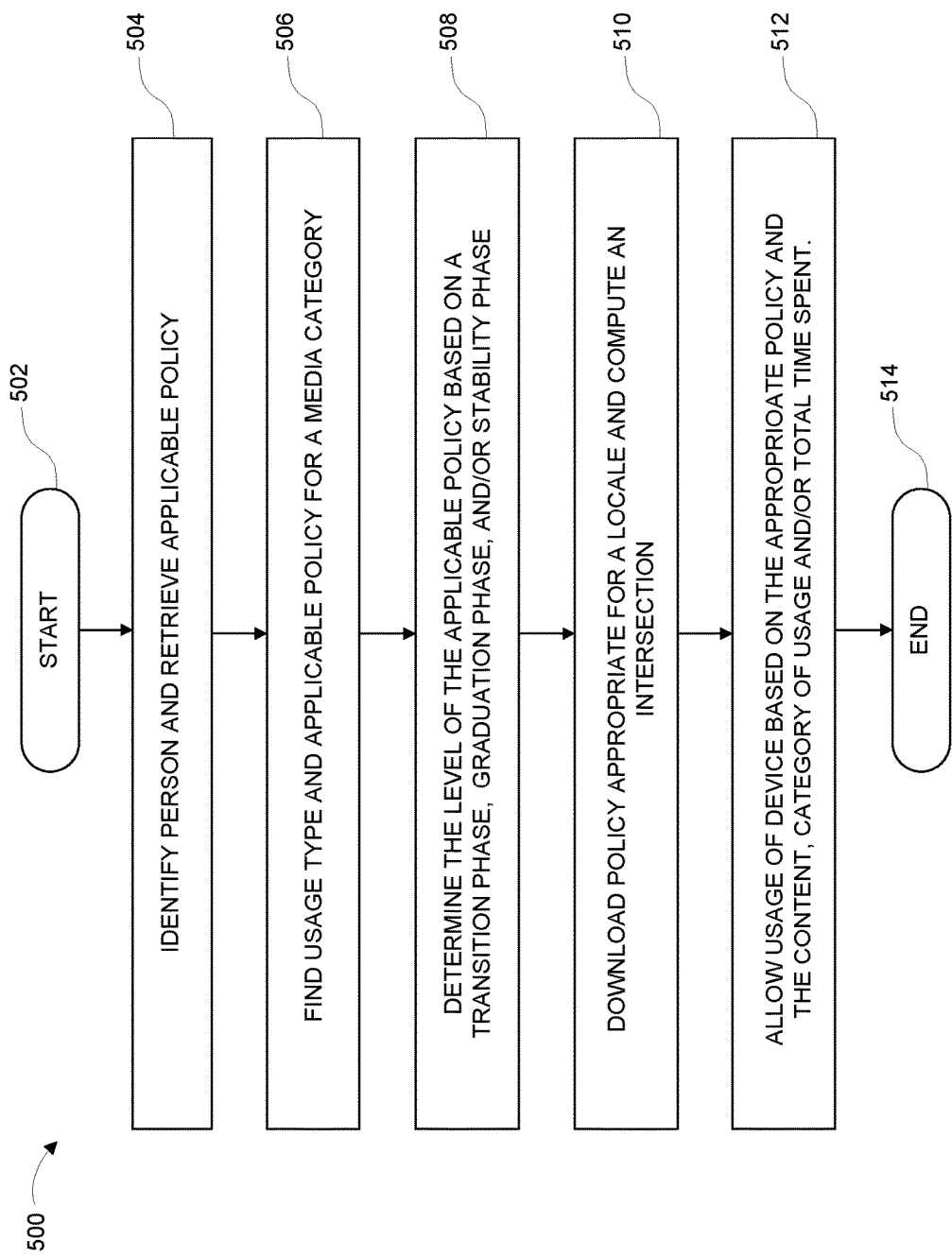
FIG. 5 is a flowchart diagram depicting an additional exemplary method for media access policy and control management by one or more processors, again in which aspects of the present invention may be realized.

Turning now to FIG. 5, a method 500 for media access policy and control management by one or more processors is depicted. The functionality 500 may be implemented as a method executed as instructions on a machine, where the instructions are included on at least one computer readable medium or one non-transitory machine-readable storage medium. The functionality 500 may start in block 502. An identity of a user (e.g., minor child under the age of 18) may be identified so as to retrieve an applicable (or assigned) media access policy for the user to view, interact, and/or engage with one or more types of media content, as in block 504. It should be noted that media policy may reside, for example, on an IoT device and/or Wi-Fi router device. The IoT device and/or Wi-Fi router device may be a centralized gateway to the "outside" world. The usage type of the media content and the applicable (or assigned) media access policy for one or more categories of media may be identified (or found) and/or located, as in block 506. A level of application of the applicable (or assigned) media access policy (e.g., "how much of the applicable (or assigned) media access policy is to be applied?") may be determined according to a transition phase, a graduation phase, and/or a stability state of the user phase, as in block 508. A graduation phase may be a selected time period when a minor child reaches a defined age or defined maturity level/phase and then advances or "transitions" from one phase to another within a defined maturity level/scale spectrum. For example, the graduation phase may be divided into several transition phases and one or more stable phases. Each stable phase may be a time period when a minor child can spend a selected amount of time in a particular phase before the child is completely/entirely adjusted to the particular stable phase and can move on to the next phase. A transition phase may gradually change the constraints (e.g., gradually change according to a selected time frame) from one stable phase to a next or subsequent phase. In other words, the graduation phase may be comparable to the process of climbing a flight of stairs to multiple floor levels where the entire graduation phase may be equivalent to going from one floor to another floor and stepping and landing on each step may be comparable to one of the stable phases. The transition phases take the child from one floor to the landing and then from the landing step to the next floor. The applicable (or assigned) media access policy may be downloaded to a type of computing device used by the user according to an area of interest, (e.g., a home of the minor child, school, academic institution, coffee shop, etc.) a connection to a wireless access point (WAP) and an intersection may be determined or computed, as in block 510. That is, the device may be the intersection of the rules and the policies that may be inherent to the device with the rules and the policies that are enforced within the household. Thus, the device may share, communicate, or provide these rules and policies when the device connects to a wireless communication device within a home, a Wi-Fi, connection hubs, and/or other WAP. The type of computing devices used by the user may be enabled for allowing a user to view, interact, and/or engage with one or more types of media content based on the appropriate policy (including any local policy of an area of interest, if any), the media content, the category of media, the media usage, and/or a total time spent or consumed by the user, or a combination thereof in viewing, interacting, and/or engaging with one or more types of media content, as in block 512. The functionality 500 may end, as in block 514.

Figure 6:
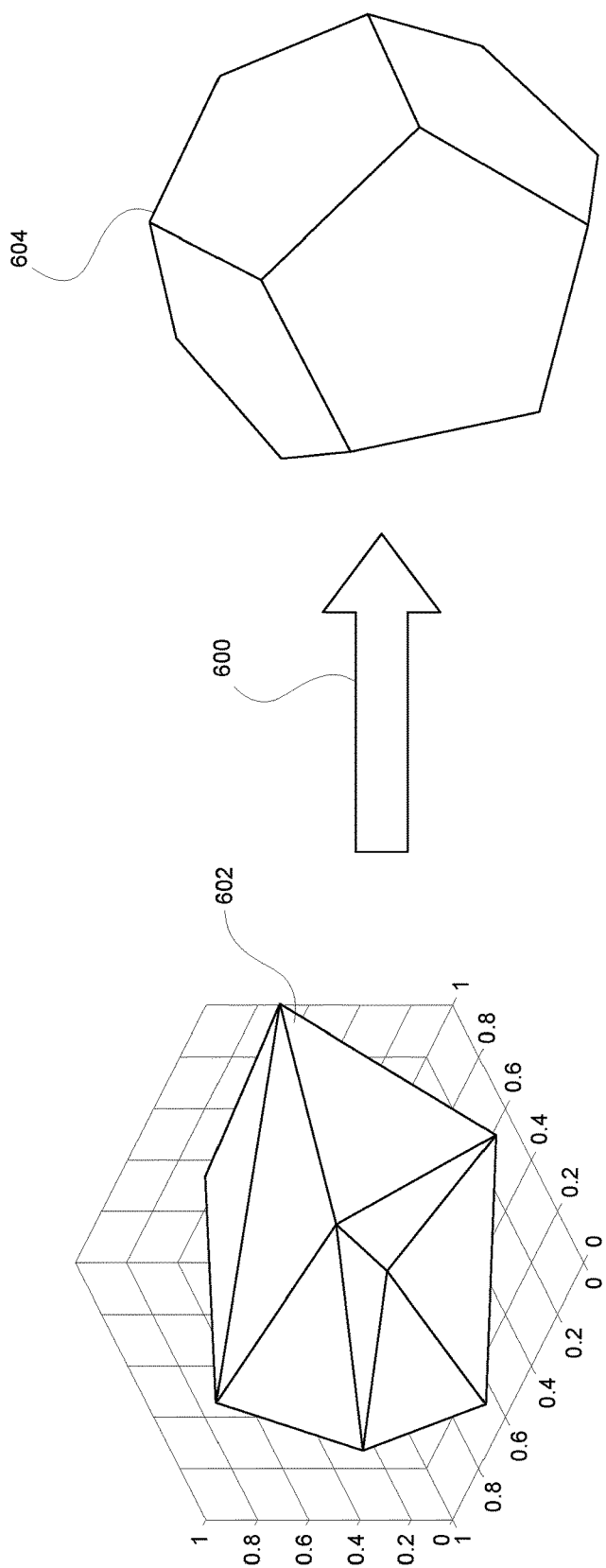
FIG. 6 is an additional block diagram depicting exemplary convex polytopes based on initial media access policy settings and desired media access policy settings in which aspects of the present invention may be realized.

In view of the method 500 of FIG. 5, consider, as an illustration of exemplary functional blocks to accomplish various purposes of the present invention, FIG. 6, following. FIG. 6 depicts exemplary convex polytopes based on initial media access policy settings and desired media access policy settings. Each of the functional blocks 600 may be implemented in hardware and/or software, such as by the computer/server 12 (FIG. 1), and/or the workloads layer 90 (FIG. 3). A convex polytope is defined in n-dimensional space and can be defined in terms of constraints in n-dimensions. Examples of such constraints can be a time period to watch for each type of media programs (each type of media programs can be either mapped together for a maximum time period to watch or interact with the media, and/or can be mapped separately for more flexibility); appropriateness of words; appropriateness of contents, etc. A point inside the polytope defines a stable state that satisfies all the constraints in all n-dimensions. It should be noted that dimensions of the polytopes need not be uniform. For example, some dimensions such as time or duration can be continuous with a smooth gradation and on the other hand some dimensions such as parental supervision (PG, PG-13 media ratings) can be discrete yet ordered or graded, and yet some dimensions may be discrete without any particular gradation such as, for example, a list of allowable words. In one aspect, one or more constraints 602 (e.g., dimensions of a polytope) may be defined and/or received from a parent/user for enforcing the desired media access policy and controls. Such constraints or dimensions may be based on items, but not limited to: 1) a media type: educational, entertainment, social, news and informational, etc., 2) media content: genre, language, violence, sex type of the user/child (e.g., male or female), and/or 3) time usage (e.g., time spent). Current values of a restraint factor, which a child is acclimated, adjusted, and/or accustomed. The adjustment to any applied constraints may be measured in terms of a degree of protests (e.g., detected negative feedback such as, for example, collected biological data of a yelling sound, a frown face, detected "negative feedback" audible words/ sounds such as "I hate this show" or "I don't want to watch this") provided by the child as well as in terms of the frequency of the protest. The degree of protest may be measured in terms of the language (e.g., using text analysis or audio analysis) which may be compared against an ontological knowledge base database and the tone (decibel level above or below a threshold) used during the protest. A desired restraint factor (or degree of protest) may be set by the parents and may each be determined, defined, and/or set to create linear constraints. At least two convex polytopes, such as the single polytope 604 of FIG. 6 (only a single polytope is depicted for illustrative convenience), may be created, based on the initial media access policy settings and the desired media access policy settings using the linear constraints created above.

Figure 7:
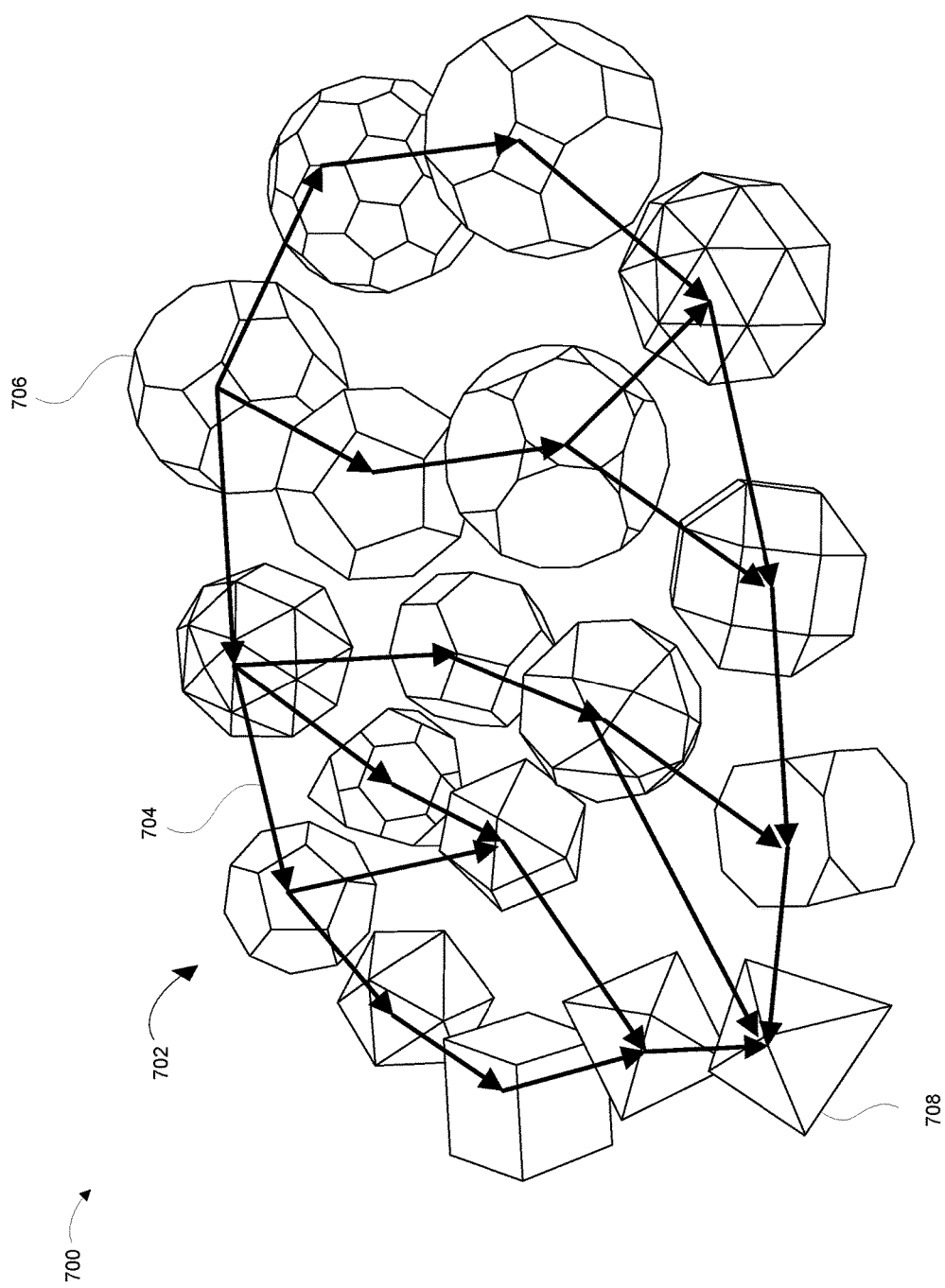
FIG. 7 is an additional block diagram depicting an exemplary one or more paths for graduating media control policies from initial polytope to desired polytopes in which aspects of the present invention may be realized.

Once at least two convex polytopes have been created, a morphing path may be created to morph from the initial polytope to the desired polytope, as in FIG. 7 that depicts a system 700 of various polytopes 702 showing one or more paths 704 for graduating media control policies from an initial polytope 706 to at least one desired polytope 708. That is, the one or more paths 704 depict iterative progression from the initial polytope 706 to one or more successive polytopes until arriving at the desired polytope 708. In one aspect, rather than ensuring satisfaction of each constraint or dimension, the present invention ensures a stable solution (e.g., the user is stable or has an emotional state that may be defined as within an acceptable and/or defined range of values, parameters, and/or descriptions) and/or a the resistance factor is less than a resistance threshold at each of a plurality of levels or stages of application of constraints of the graduating media control policies, such as, for example, where a user/child may be allowed to be exposed to one or more of the plurality of levels or stages of constraints of the graduating media control policies or spend a certain amount of time intervals (weeks or days) prior to advancing to a next, sequential level or stage of the constraints of the graduating media control policies.

In one aspect, the properties of each of the one or more of the plurality of levels or stages of constraints or stable intermediate steps may include each of the following operations or steps. For example, one of the transition steps might be moving the duration of academic programs by 30 mins and reducing the duration of an entertainment program by 15 mins at the same time allowing PG-13 programs and keeping the allowable word list constant. After an incremental modification in the same direction, the system may recognize how the affected minor child adjusts to the same situation. The system may then wait until the duration of the protests as well as the tone of the protests are reduced below a defined threshold or defined tolerable levels. At each one of the levels of constraints or steps of applying a portion of the graduating media control policies, the polytope must remain convex and a substantially round or circular shape. The substantially round or circular shape ensures that a solution for a next stage exists as well as makes it easier for both the parents and user/child to adjust to each of the plurality of levels or stages of constraints of the graduating media control policies. The substantially round or circular shape of a polygon may be defined as a polytope whose second order moment may be relatively small. The regularity of a polytope defines how well behaved the solution space is. In other words, the constraints or the restrictions may be liberally defined or applied while keeping constraints on the second order extremely restricted and applied. For example, since it may be difficult to find a solution to go from a media rating of "G" to a media rating of "PG-13" without relaxing some of the word lists. That regularity of the solution space is defined in terms of the second or any higher order moments. In this particular example, because the present invention is allowing both discrete and continuous dimensions of the polytopes the second order moment may be taken as the normalized distances for each dimension. For a polygon to be "well behaved" (e.g., behavior within a defined range of appropriateness) the maximum normalized distance may not be more than 2-3 times the minimum normalized distance of any dimensions. In other words, all the vertices, as well as planes and edges, of the polytope may be close to the polytopes center of gravity. A history for each of the operations or steps may be retained, tracked, and/or preserved so as to allow backtracking, if necessary.

In an additional example, the morphing operations and/or steps may use a resistance factor. A resistance factor of the user to the media access policy and controls for each dimension may be assigned. The resistance factor may be derived using a cognitive method based on the speech/language, behavior, and/or emotion (e.g., mood) of the user/child that signifies a negative response upon implementation of one or more constraints or levels of the media access policy and controls. At each morphing step or operation, the present technology may iteratively attempt to morph the polytope in a direction of the least resistance (e.g., a lower resistance factor depicting less resistance or a lessor negative response as compared to a higher, determined resistance factor indicating an increased/greater resistance or an increased or greater or increased negative response) so as to allow preserving stability of the intermediate solution. In an alternative embodiment, the resistance factor may be created to be more elastic and adjustable based on any flexibility that may be available on the parent side. This may be defined where parents are not inflexible about their defined constraints and are willing to relax or loosen the application of the constraints if the adjustments of the minor child become very difficult or unchanging. For example, using our previous example, a parent may adjust the duration of entertainment type of program, from 30 minutes to 10 minutes and then find that the child cannot adjust to this time. The parent or guardian may then relax or "redefine" the constraint to 15 minutes (e.g., from 30 minutes to 15 minutes) if it becomes difficult for the child to adjust. A user/child may be considered adjusted, acclimated, and/or graduated from each one of the plurality of levels or stages of constraints of the graduating media control policies when the resistance factor is less than a predetermined resistance factor threshold. In other words, a next, sequential morphing step or operation is applied only after the resistance factor goes down to a tolerable level (e.g., resistance factor is less than a predetermined resistance factor threshold).

Figure 8:
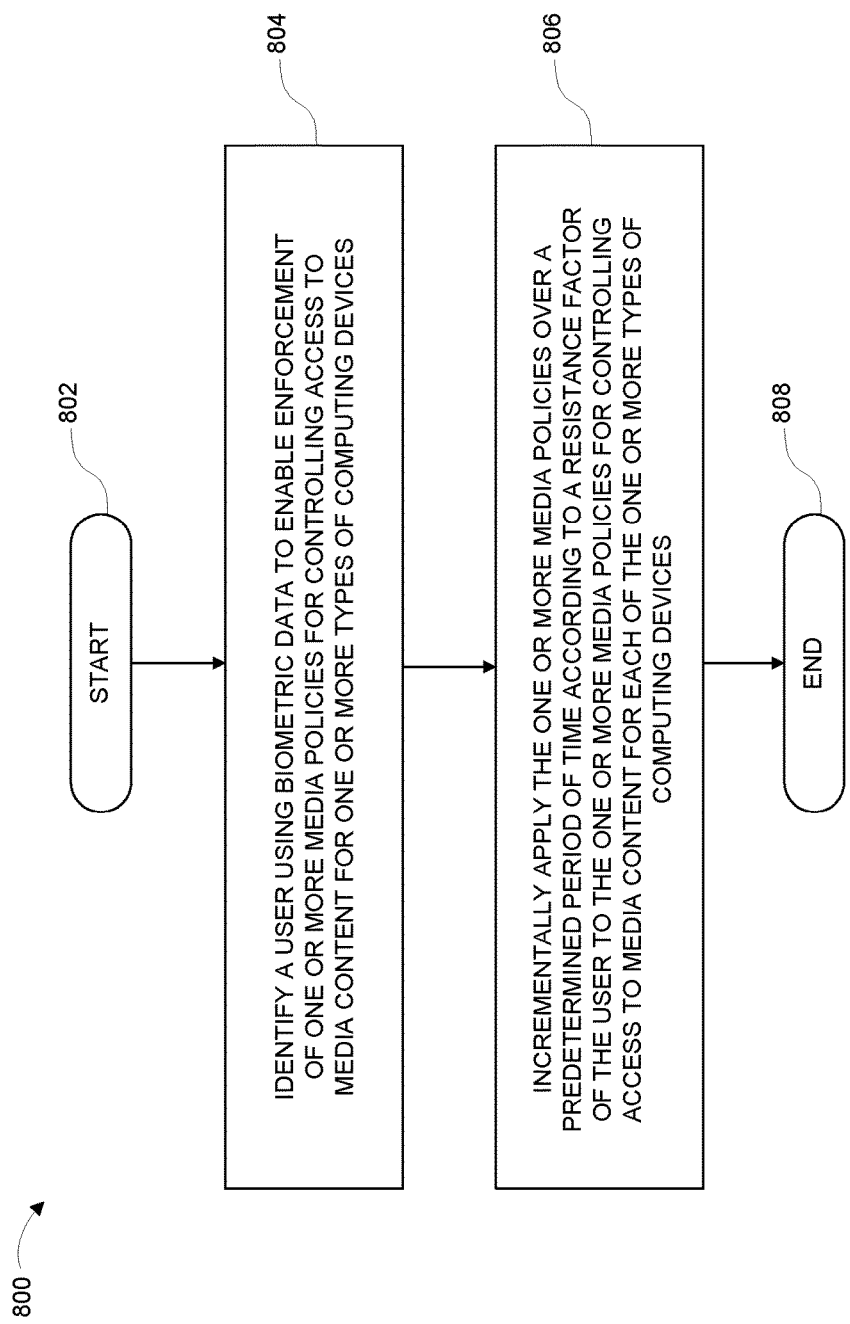
FIG. 8 is a flowchart diagram depicting an additional exemplary method for media access policy and control management by one or more processors, again in which aspects of the present invention may be realized.

Turning now to FIG. 8, a method 800 for media access policy and control management by one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. A user (e.g., a minor child under the age of 18) may be identified using biometric data to enable enforcement of one or more media policies for controlling access to media content for one or more types of computing devices, as in block 804. The one or more media policies may be incrementally applied over a predetermined period of time according to a resistance factor of the user to the one or more media policies for controlling access to media content for each of the one or more types of computing devices (e.g., computers, laptops, smart phones, televisions, or other devices capable of providing various types of media content), as in block 806. The functionality 800 may end, as in block 808.

In one aspect, in conjunction with and/or as part of at least one block of FIGS. 5 and 8, the operations of methods 500 and 800 may include each of the following. The operations of methods 500 and/or 800 may set a resistance factor equal to a value within a range of values, wherein the range of values include at least values representing a degree of familiarity of the user with one of a plurality of constraints of the one or more media policies and defined values defined by a parent or guardian of a minor child representing a positive impact of the user with one of a plurality of constraints, and/or assigns the resistance factor to each one of a plurality of constraints of the one or more media policies.

The operations of methods 500 and/or 800 may apply the one or more media policies and controls over a predetermined period of time. The operations of methods 500 and/or 800 may also include iteratively applying selected portions of the one or more media policies upon the resistance factor being less than a resistance threshold. The operations of methods 500 and/or 800 may increase the resistance factor upon detection of a negative response of the user to one of a plurality of constraints of the one or more media policies, and/or decrease the resistance factor upon detection of a positive response of the user to one of a plurality of constraints of the one or more media policies.

One or more media policies may be defined for controlling access to the media content according to one of a plurality of constraints, wherein the plurality of constraints include at least a type of media, a category of media, media content, a usage time of engaging the media content, identified contextual factors of the user based on speech of the user, an emotional response of a user to the one or more media policies, behavior of the user relating to the one or more media policies.

The operations of methods 500 and/or 800 may implement the one or more media policies upon the user using the one or more types of computing devices within a defined area of interest or upon connection to one or more wireless access points (WAP). Feedback information may be collected from the one or more types of computing devices upon implementing the one or more media policies for the user; and/or a machine learning mechanism may be implemented that uses the feedback information to apply an application of each selected portion of the plurality of constraints of the one or more media policies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for media access policy and control management by one or more processors, comprising:
    identifying a user using biometric data to enable enforcement of one or more media policies for controlling access to media content for one or more types of computing devices;
    incrementally applying the one or more media policies over a predetermined period of time according to a resistance factor of the user to the one or more media policies for controlling access to media content for each of the one or more types of computing devices; and
    setting the resistance factor equal to a value within a range of values, wherein the range of values include at least values representing a degree of familiarity of the user with one of a plurality of constraints of the one or more media policies and defined values representing a positive impact of the user with one of a plurality of constraints.

2. The method of claim 1, further including assigning the resistance factor to each one of a plurality of constraints of the one or more media policies.

3. The method of claim 1, wherein incrementally applying the one or more media policies over a predetermined period of time further includes iteratively applying selected portions of the one or more media policies upon the resistance factor being less than a resistance threshold.

4. The method of claim 1, further including:
increasing the resistance factor upon detection of a negative response of the user to one of a plurality of constraints of the one or more media policies; or
decreasing the resistance factor upon detection of a positive response of the user to one of a plurality of constraints of the one or more media policies.

5. The method of claim 1, further including defining the one or more media policies for controlling access to the media content according to one of a plurality of constraints, wherein the plurality of constraints include at least a type of media, a category of media, media content, a usage time of engaging the media content, identified contextual factors of the user based on speech of the user, an emotional response of a user to the one or more media policies, behavior of the user relating to the one or more media policies.

6. The method of claim 5, further including implementing the one or more media policies upon the user using the one or more types of computing devices within a defined area of interest or upon connection to one or more wireless access points (WAP).

7. The method of claim 6, further including:
collecting feedback information from the one or more types of computing devices upon implementing the one or more media policies for the user;
initializing a machine learning mechanism using the feedback information to apply an application of each selected portion of the plurality of constraints of the one or more media policies.

8. A system for media access policy and control management, comprising:
one or more computers with executable instructions that when executed cause the system to:
identify a user using biometric data to enable enforcement of one or more media policies for controlling access to media content for one or more types of computing devices;
incrementally apply the one or more media policies over a predetermined period of time according to a resistance factor of the user to the one or more media policies for controlling access to media content for each of the one or more types of computing devices; and
set the resistance factor equal to a value within a range of values, wherein the range of values include at least values representing a degree of familiarity of the user with one of a plurality of constraints of the one or more media policies and defined values representing a positive impact of the user with one of a plurality of constraints.

9. The system of claim 8, wherein the executable instructions
assign the resistance factor to each one of a plurality of constraints of the one or more media policies.

10. The system of claim 8, wherein incrementally applying the one or more media policies over a predetermined period of time further includes iteratively applying selected portions of the one or more media policies upon the resistance factor being less than a resistance threshold.

11. The system of claim 8, wherein the executable instructions:
increase the resistance factor upon detection of a negative response of the user to one of a plurality of constraints of the one or more media policies; or
decrease the resistance factor upon detection of a positive response of the user to one of a plurality of constraints of the one or more media policies.

12. The system of claim 8, wherein the executable instructions define the one or more media policies for controlling access to the media content according to one of a plurality of constraints, wherein the plurality of constraints include at least a type of media, a category of media, media content, a usage time of engaging the media content, identified contextual factors of the user based on speech of the user, an emotional response of a user to the one or more media policies, behavior of the user relating to the one or more media policies.

13. The system of claim 12, wherein the executable instructions implement the one or more media policies upon the user using the one or more types of computing devices within a defined area of interest or upon connection to one or more wireless access points (WAP).

14. The system of claim 13, wherein the executable instructions:
collect feedback information from the one or more types of computing devices upon implementing the one or more media policies for the user; and
initialize a machine learning mechanism using the feedback information to apply an application of each selected portion of the plurality of constraints of the one or more media policies.

15. A computer program product for media access policy and control management by one or more processors, the computer program product comprising a non-transitory computer-readable storage medium having computer-readable program code portions stored therein, the computer-readable program code portions comprising:
an executable portion that identifies a user using biometric data to enable enforcement of one or more media policies for controlling access to media content for one or more types of computing devices;
an executable portion that incrementally applies the one or more media policies over a predetermined period of time according to a resistance factor of the user to the one or more media policies for controlling access to media content for each of the one or more types of computing devices; and
an executable portion that sets the resistance factor equal to a value within a range of values, wherein the range of values include at least values representing a degree of familiarity of the user with one of a plurality of constraints of the one or more media policies and defined values representing a positive impact of the user with one of a plurality of constraints.

16. The computer program product of claim 15, further including an executable portion that
assigns the resistance factor to each one of a plurality of constraints of the one or more media policies.

17. The computer program product of claim 15, wherein incrementally applying the one or more media policies over a predetermined period of time further includes an executable portion that iteratively applies selected portions of the one or more media policies upon the resistance factor being less than a resistance threshold.

18. The computer program product of claim 15, further including an executable portion that:
increases the resistance factor upon detection of a negative response of the user to one of a plurality of constraints of the one or more media policies; or decreases the resistance factor upon detection of a positive response of the user to one of a plurality of constraints of the one or more media policies.

19. The computer program product of claim 15, further including an executable portion that defines the one or more media policies for controlling access to the media content according to one of a plurality of constraints, wherein the plurality of constraints include at least a type of media, a category of media, media content, a usage time of engaging the media content, identified contextual factors of the user based on speech of the user, an emotional response of a user to the one or more media policies, behavior of the user relating to the one or more media policies.

20. The computer program product of claim 15, further including an executable portion that:
    implements the one or more media policies upon the user using the one or more types of computing devices within a defined area of interest or upon connection to one or more wireless access points (WAP);
    collects feedback information from the one or more types of computing devices upon implementing the one or more media policies for the user; and
    initializes a machine learning mechanism using the feedback information to apply an application of each selected portion of the plurality of constraints of the one or more media policies.

\* \* \* \* \*